United States Patent Office 3,846,137
Patented Nov. 5, 1974

3,846,137
SPECTRALLY SENSITIZED DIRECT
POSITIVE EMULSION
Oskar Riester, Leverkusen, and Hans Ohlschlager and
Heinrich Odenwalder, Cologne, Germany, assignors to
Agfa-Gevaert Aktiengesellschaft, Leverkusen, Germany
Filed Aug. 23, 1972, Ser. No. 282,968
Claims priority, application Germany, Aug. 27, 1971,
P 21 42 967.4
Int. Cl. G03c 1/16, 1/18
U.S. Cl. 96—130
3 Claims

ABSTRACT OF THE DISCLOSURE

Light-sensitive photographic direct positive material comprising at least one direct positive fogged silver halide emulsion layer, are spectrally sensitized with a polymethine sensitizing dye containing a cyano, nitro or acyl group in the $\alpha$- and/or $\gamma$-position of the methine chain.

---

Figure 1:
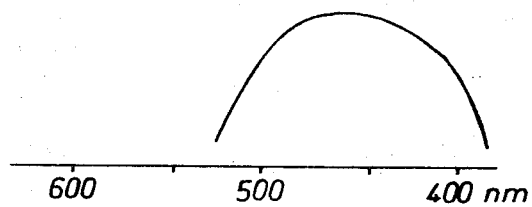

The invention relates to photographic direct positive silver halide emulsions which are spectrally sensitized by polymethine sensitizers which contain a negative substituent in the methine chain.

Numerous sensitizing dyes are known for sensitizing the usual negative silver halide emulsions, e.g. mono- or tri-methinecyanines, merocyanines or rhodacyanines.

The known sensitizing dyes cannot in most cases be used for sensitizing direct positive emulsions, e.g. emulsions which are processed to produce positive images after the usual exposure and development, because they generally cause flattening of the gradation. On the other hand, compounds which can only be used as sensitizing dyes for direct positive emulsions have already been described. These compounds cause desensitization in negative emulsions and their sensitizing effect is unsatisfactory. Indocyanines are examples of sensitizing dyes which have been used for direct positive emulsions. They are quite suitable stensitizers for the red region of the spectrum but their sensitizing effect is still not completely satisfactory. The same objection applies to the direct positive indole sensitizing dyes for the green region of the spectrum and to the bis-thiazolyl and bis-selenazolyl sensitizing dyes.

It is among the objects of the present invention to provide sensitizing dyes for direct positive emulsions which are sufficiently intensive in their sensitizing action and do not affect the gradation deleteriously.

We now have found a photographic material containing at least one direct positive silver halide emulsion layer which is spectrally sensitized with a polymethine sensitizer which contains a cyano, acyl or nitro group in the $\alpha$- or $\gamma$-position in the methine chain.

Dyes of this type have already been described as spectral sensitizers for the usual silver halide emulsions (Mitteilungen aus den Forschungslaboratorien der Agfa, Leverkusen-München, publishers Springer-Verlag 1955, page 44, et seq.). Their suitability for direct positive emulsions is particularly surprising because is has previously been considered that for sensitizing direct positive emulsions it is necessary to use special desensitizing heterocyclic compounds. With the class of sensitizers presented here it has been possible for the first time to provide a class of compounds which can be used for both ordinary negative silver halide emulsions and for direct positive emulsions.

The unexpected effect of the sensitizers to be used in accordance with the invention is based in principle on the negative substituents in the $\alpha$- and/or $\gamma$-position of the polymethine chain. The chemical structure of the heterocyclic rings which are attached to this substituted polymethine chain and the length of the chain are only of secondary importance. Heterocyclic groups suitable for the sensitizers of this invention are the heterocyclic rings commonly used in cyanine chemistry such as oxazole, benzoxazole, naphthoxazole, thiazole, benzothiazole, naphthothiazole, thiazoline, selenazole, benzoselenazole, naphthoselenazole, pyrrolenine, indolenine, pyridine, quinoline, pyrimidine, thiadiazole, oxadiazole, or tetrazole. The substitution of the sensitizers may be symmetric or asymmeric with respect to the heterocyclic rings. The sensitizers to be used according to the invention have an ionic structure, i.e. one of the ring nitrogens is positively charged, and the corresponding anion may be present separately or it may be attached to the sensitizer molecule itself, e.g. to the substituent on the positively charged ring nitrogen. In the latter case, the compounds have a betaine form.

The sensitizers to be used according to the invention are represented by the following general formula:

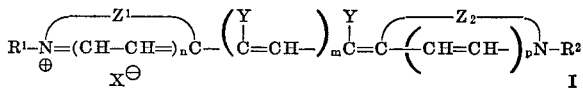

I

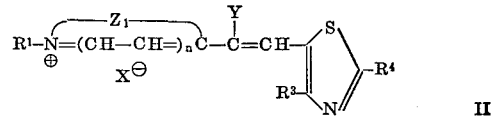

II

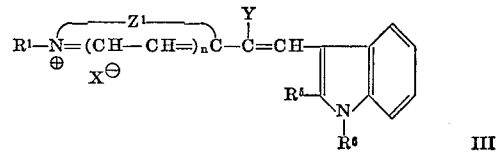

III wherein represent

Y= (1) cyano, (2) nitro, (3) an acyl group which may be derived from an aliphatic or aromatic carboxylic acid, e.g. from benzoic acid, or (4) hydrogen; at least one of the groups Y having the meaning given as (1), (2) or (3);

$R^1$, $R^2$= (1) a saturated or unsaturated aliphatic group which preferably contains up to 6 carbons atoms and which may be substituted, e.g. with phenyl, hydroxyl or halogen such as fluorine, chlorine or bromine, carboxyl, esterified carboxyl, carbamoyl, sulfo or esterified sulfo, (2) cycloalkyl such as cyclohexyl or (3) aryl, particularly phenyl which may be substituted;

$R^3$= (1) hydrogen, (2) saturated or olefinically unsaturated aliphatic groups which preferably contain up to 3 carbon atoms, for example methyl or ethyl, or (3) an aryl, e.g. phenyl;

$R^4$=$SR^7$ or $NR^8R^9$;

$R^5$=a phenyl group which may be substituted with alkyl having preferably up to 3 carbon atoms such as methyl or ethyl, with aryl such as phenyl, with alkoxy having preferably up to 3 carbon atoms such as methoxy or ethoxy or with halogen such as chlorine or bromine, these substituents being preferably in the para position;

$R^6$= (1) hydrogen, (2) a saturated or unsaturated aliphatic group with preferably up to 6 carbon atoms such as methyl or ethyl (3) aryl, for example phenyl or substituted phenyl or (4) alkoxy, for example methoxy or alkoxy;

$R^7$, $R^8$, $R^9$,=saturated or unsaturated aliphatic groups with preferably up to 6 carbon atoms, for example methyl or ethyl, or aryl, in particular phenyl;

$R^8$, $R^9$ together may further represent the ring members required for completing a heterocyclic ring, e.g. for completing a pyrrolidine, piperidine, morpholine, thiomorpholine, indoline or tetrahydroquinoline ring;

$n$=0 or 1;

$m$=0, 1, 2 or 3, preferably 1 or 2;

$p$=0 or 1;

X⁻ = any anion, e.g. a halide such as chloride, bromide or iodide, perchlorate, sulfate, methyl sulfate, p-toluene sulfonate;

$Z^1$, $Z^2$ = the ring members required for completing a 5- or 6- membered heterocyclic ring; the heterocyclic group may contain a condensed benzene or naphthalene ring and other substituents; the usual heterocyclic rings of cyanine chemistry are suitable, for example those based on thiazole (e.g. thiazole, 4-methylthiazole, 5 - methylthiazole, 5 - phenyltriazole or 4,5-diphenylthiazole), benzothiazole (e.g. benzothiazole, 4-chlorobenzothiazole, 5 - chlorobenzothiazole, 6-chlorobenzothiazole, 7 - chlorobenzothiazole, 6-bromobenzothiazole 5 - iodobenzothiazole, 6-iodobenzothiazole, 4-methylbenzothiazole, 5 - methylbenzothiazole, 6-methylbenzothiazole, 5,6 - dimethylbenzothiazole, 4-phenylbenzothiazole, 5 - phenylbenzothiazole, 6-phenylbenzothiazole, 5 - hydroxybenzothiazole, 6-hydroxybenzothiazole, 4 - methoxybenzothiazole, 5 - methoxybenzothiazole, 6 - methoxybenzothiazole, 5 - ethoxybenzothiazole, 6-ethoxybenzothiazole, 5,6 - dimethoxybenzothiazole, 5,6 - methylene-dihydroxybenzothiazole, 5-diethylaminobenzothiazole, 6 - diethylaminobenzothiazole, 6-nitrobenzothiazole, 5-carboxybenzothiazole, 5-sulfobenzothiazole, 6-cyanobenzothiazole, 5-trifluoromethyl-benzothiazole, 5-benzoylbenzothiazole, tetrahydrobenzothiazole or 7-oxotetrahydrobenzothiazole), naphthothiazole (e.g. naphtho[1,2-d]thiazole, naphtho-[2,1-d]thiazole, 7-methoxynaphtho[2,1-d]thiazole or 8-methoxynaphtho[1,2-d]thiazole), selenazole (e.g. 4-methylselenazole or 4-phenylselenazole), benzoselenazole (e.g. benzoselenazole, 5-chlorobenzoselenazole, 5,6-dimethylbenzoselenazole, 5 - hydroxybenzoselenazole, 5 - methoxybenzoselenazole or tetrahydrobenzoselenazole), naphthoselenazole (e.g. naphtho[1,2-d]selenazole or naphtho [2,1-d]selenazole), oxazole (e.g. oxazole, 4 - methyloxazole, 4 - phenyloxazole, or 4,5-diphenyloxazole), benzoxazole (e.g. benzoxazole, 5-chlorobenzoxazole, 6 - chlorobenzoxazole, 5,6 - dimethylbenzoxazole, 5 - phenylbenzoxazole, 5 - hydroxybenzoxazole, 5 - methoxybenzoxazole, 5 - phenylbenzoxazole, 5 - hydroxybenzoxazole, 5 - methoxybenzoxazole, 5 - ethoxybenzoxozole, 6 - dialkylaminobenzoxazole, 5 - carboxybenzoxazole, 5 - sulfobenzoxazole, sulfonamidobenzoxazole or 5 - carboxyvinylbenzoxazole), naphthoxazole (e.g. naphtho[1,2-d]oxazole, naphtho [2,1-d]oxazole or naphtho[2,3-d]oxazole), 3,4-dialkylindolenine (e.g. 3,3 - dimethylindolenine, 3,3,5 - trimethylindolenine or 3,3-dimethyl - 5 - methoxy-indolenine), 2 - pyridine (e.g. pyridine, 3 - methylpyridine, 4 - methylpyridine, 5 - methylpyridine, 6 - methylpyridine, 3,4 - dimethylpyridine, 3,5 - dimethylpyridine, 3,6-dimethylpyridine, 4,5 - dimethylpyridine, 4,6-dimethylpyridine, 4 - chloropyridine, 5 - chloropyridine, 6-chloropyridine, 3 - hydroxypyridine, 4 - hydroxypyridine, 5 - hydroxypyridine, 3 - phenylpyridine, 4 - phenylpyridine or 6 - phenylpyridine), 4 - pyridine (e.g. 2-methylpyridine, 3 - methylpyridine, 2,3-dimethylpyridine, 2,5 - dimethylpyridine, 2,6 - dimethylpyridine, 2-chloropyridine, 3 - chloropyridine, 2 - hydroxypyridine or 3 - hydroxypyridine), 2 - quinoline (e.g. quinoline, 3 - methylquinoline, 5 - methylquinoline, 7 - methylquinoline, 8 - methylquinoline, 6 - chloroquinoline, 8-chloroquinoline, 6 - methoxyquinoline, 6 - ethoxyquinoline, 6 - hydroxyquinoline, 8 - hydroxyquinoline, or 5-oxo - 5,6,7,8 - tetrahydroquinoline), 4 - quinoline (e.g. quinoline, 6 - methoxyquinoline, 7 - methylquinoline or 8 - methylquinoline), isoquinoline (e.g. isoquinoline or 3,4 - dihydroisoquinoline), thiazoline (e.g. thiazoline or 4 - methylthiazoline), and those based on pyrroline, tetrapyridine, thiadiazole, triazole, tetrazole, oxazoline, oxadiazole, pyrimidine, triazine, benzothiazine, pyrimidone or thiopyrimidone.

The aryl groups and heterocyclic groups may carry any additional substituents, e.g. additional alkyl groups, preferably containing up to 3 carbon atoms such as methyl or ethyl, halogen such as chlorine or bromine, hydroxyl, alkoxy, preferably containing up to 3 carbon atoms such as methoxy or ethoxy, hydroxylalkyl, alkylthio, aryl such as phenyl, aralkyl such as benzyl, amino, substituted amino or nitro.

Examples of suitable sensitizers are the compounds represented by the following formulae:

| | | Sensitization maximum in nm. |
|---|---|---|
| 1 | 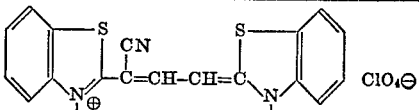 | 570 |
| 2 | 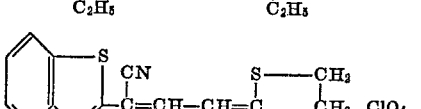 | 500 |
| 3 | 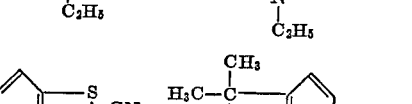 | 572 |
| 4 | 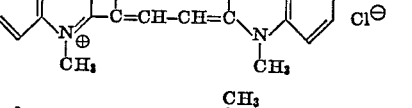 | 540 |

TABLE—Continued
| | | Sensitization maximum in nm. |
|---|---|---|
| 5 | 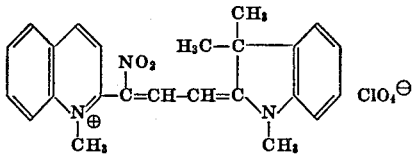 | 545 |
| 6 | 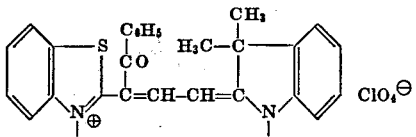 | 545 |
| 7 | 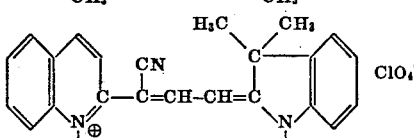 | 585 |
| 8 | 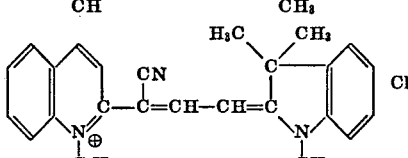 | 590 |
| 9 | 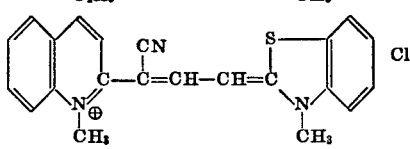 | [1] 535+590 |
| 10 | 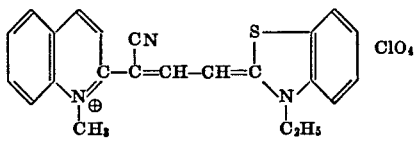 | 595 |
| 11 | 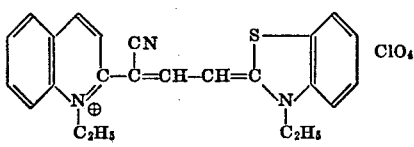 | 595 |
| 12 | 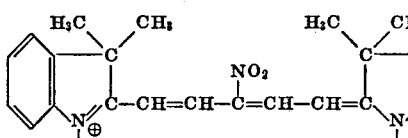 | 640 |
| 13 | 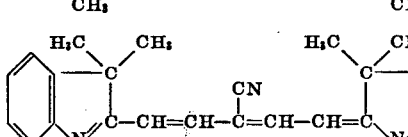 | 655 |
| 14 | 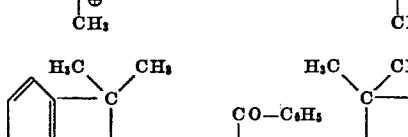 | 655 |
| 15 | 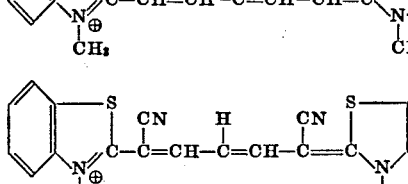 | [2] |

TABLE—Continued
| | | Sensitization maximum in nm. |
|---|---|---|
| 16 |  | (¹) |
| 17 |  | 590 |
| 18 |  | 605 |
| 19 |  | 585 |
| 20 | 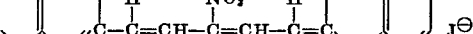 | 570 |
| 21 |  | 582 |
| 22 |  | 578 |
| 23 |  | 600 |
| 24 | 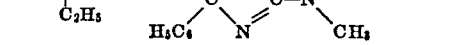 | 535 |
| 25 |  | 555 |
| 26 | 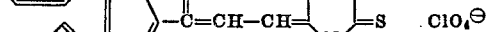 | 585 |

TABLE—Continued

| No. | Structure | Sensitization maximum in nm. |
|---|---|---|
| 27 | (structure) | 540 |
| 28 | (structure) | 540 |
| 29 | (structure) | 580 |
| 30 | (structure) | 530 |
| 31 | (structure) | 580 |
| 32 | (structure) | 555 |
| 33 | (structure) | 540 |
| 34 | (structure) | 545 |
| 35 | (structure) | 555 |
| 36 | (structure) | 525 |

TABLE—Continued

| | | Sensitization maximum in nm. |
|---|---|---|
| 37 | [structure] | 555 |
| 38 | [structure] | 550 |
| 39 | [structure] | 565 |
| 40 | [structure] | 565 |
| 41 | [structure] | 520 |
| 42 | [structure] | 550 |
| 43 | [structure] | 515 |
| 44 | [structure] | 545 |
| 45 | [structure] | 540 |
| 46 | [structure] | 590 |

TABLE—Continued

| | | Sensitization maximum in nm. |
|---|---|---|
| 47 | [structure] | 575 |
| 48 | [structure] | 540 |
| 49 | [structure] | 580 |
| 50 | [structure] | 600 |
| 51 | [structure] | 535 |
| 52 | [structure] | 670 |
| 53 | [structure] | 665 |
| 54 | [structure] | 655 |
| 55 | [structure] | 665 |
| 56 | [structure] | (4) |

| | Sensitization maximum in nm. |
|---|---|
| 57. [structure: benzothiazole-CH=C(CN)-CH=benzothiazole-NO₂, N-C₂H₅, N-C₂H₅, Cl⁻] | 600 |
| 58. [structure: dihydrothiazine-CH=C(CN)-CH=benzothiazole-NO₂, N-CH₃, N-C₂H₅, ClO₄⁻] | 540 |
| 59. [structure: 3,3-dimethylindoline-C(CN)=CH-CH=benzothiazole-NO₂, N-CH₃, N-C₂H₅, Cl⁻] | 585 |
| 60. [structure: H₃C-N, O=, N-CH₃ pyrimidinone-C(CN)=CH-CH=benzothiazole-Cl, N-C₂H₅, ClO₄⁻] | 590 |
| 61. [structure: benzothiazole-C(CN)=CH-CH=benzimidazole with N-CH₂-CH=CH₂ groups, N-C₂H₅, Cl⁻] | 600 |
| 62. [structure: dihydrothiazine-C(CN)=CH-CH=benzimidazole with N-CH₂-CH=CH₂ groups, N-CH₃, ClO₄⁻] | 550 |
| 63. [structure: benzoxazole-C(CN)=CH-CH=benzothiazole-CN, N-CH₃, N-C₂H₅, Cl⁻] | 555 |
| 64. [structure: 3,3-dimethylindoline-C(CN)=CH-CH=benzothiazole-CN, N-CH₃, N-C₂H₅, ClO₄⁻] | 570 |
| 65. [structure: 3,3-dimethylindoline-C(CN)=CH-CH=CH-C(CN)=3,3-dimethylindoline, N-CH₃, N-CH₃, ClO₄⁻] | 655 |

¹ Broad.  ² 560 and 660.  ³ 570 and 665.  ⁴ 615 and 670.

The dyes according to the invention may be prepared by known methods. Reference is made to the paper by Beattie et al., J. Chem. Soc. 1932, 260, U.S. Pat. specification 2,393,743 and British patent specification 620,801. α-Substituted trimethine cyanines of Formula I are easily obtained by condensing the correspondingly substituted methylene compounds of Formula IV in which Y, $R^1$, $n$ and $Z^1$ have the meanings indicated above with acetanilide compounds of Formula V in which $Z^2$, $R^2$, $p$ and $X^-$ have the meaning indicated above.

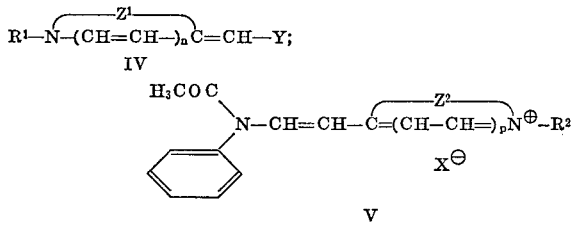

The reaction may be carried out at temperatures ranging from 15° C. to the reflux temperature of the mixture and the reactants can be applied in equimolar or approximately equimolar proportions.

The reaction may be carried out in the presence or absence of a condensing agent, for example a trialkylamine, in an inert solvent, for example an alcohol, e.g. ethanol or acetic acid anhydride.

The α-substituted compounds of formulae II and III are obtained correspondingly by condensing an aldehyde of formula VI or VII in which $R^3$, $R^4$, $R^5$ and $R^6$ have the meanings already indicated with a methylene compound of formula IV, in the presence of at least an equivalent quantity of an acid, e.g. acetic acid. Condensation may also advantageously be performed in glacial acetic acid in the presence of a condensing agent such as phosphorous oxychloride. Thiazole aldehydes of formula VI can easily be obtained from the corresponding thiazoles by a Vilsmeier reaction as described in German patent specifications No. 1,137,024 and 1,147,584.

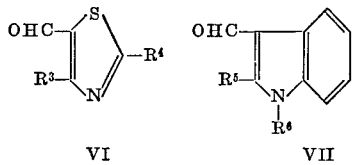

γ-Nitro-pentamethine cyanines of formula I are described in Liebigs Ann. Chem. 715, pages 74–89 (1968).

The preparation of dyes 27, 29 and 30 is described in detail below:

Dye 27

2.3 g. of 2-benzoylmethylene-1-methyl-dihydroquinoline and 2.3 g. of 1 - methyl - 2 - phenyl - indoaldehyde - 3 are heated under reflux in 5 ml. of glacial acetic acid and 5 ml. of acetic acid anhydride for 20 minutes. The mixture is cooled and precipitated with a sodium perchlorate solution. The dye is suction filtered and recrystallized twice from 150 ml. of methanol. 2.9 g. of dye are obtained. M.p. 176–178° C.; absorption maximum 470 nm. (in acetone).

Dye 29

1.0 g. of 2-cyanomethylene-3-ethyl-benzothiazole and 1.7 g. of 4-acetanilidovinyl-1,3-dimethyl-pyrimidone-2-perchlorate are heated under reflux in 10 ml. of acetic acid anhydride for 10 minutes. The dye precipitates on boiling. The mixture is cooled and the dye is suction filtered and recrystallized from methanol. Yield=11.4 g., m.p.: 268–269° C., absorption maximum 525 nm. (in acetone).

Dye 30

2.0 g. of 2-cyanomethylene-3-methyl-thiazoline and 2.9 g. of 2-methyl-phenylamine-4-phenyl-thiazole-aldehyde-5 in 10 ml. of glacial acetic acid to which 2 ml. of phosphorous oxychloride have been added are heated on a steam bath for 5 minutes. The mixture is then cooled and the dye is precipitated with sodium perchlorate solution, suction filtered and recrystallized twice from 75 ml. of glacial acetic acid. Yield=3.4 g., M.p.: 188° C., absorption maximum 493 nm. (in methanol).

The sensitizers to be used according to the invention effect spectral sensitization in direct positive silver halide emulsions, resulting in exceptionally high sensitivity and excellent steepness of the gradation. The direct positive images obtained have an exceptionally slight fog. If sensitizers of a similar structure but without the negatively acting substituents in the polymethine chain are used for comparison, very little or no sensitization is observed. The gradation obtained is very flat and the fog in the positive image is so heavy that practical use is impossible.

The excellent sensitizing effect of the compounds is preserved even in the presence of dissolved or emulsified color couplers.

The sensitizers to be used according to the invention may be employed in any silver halide emulsion. The silver halide may be silver chloride, silver bromide or a mixture thereof, to which a small quantity of silver iodide may be added. The silver halides may be dispersed in the usual hydrophilic binders, for example carboxymethyl cellulose, polyvinyl alcohol, polyvinyl pyrrolidone, alginic acid and its salts, esters or imides or proteins, preferably gelatin.

Any type of direct positive photographic emulsions can be spectrally sensitized by the sensitizing dyes of the present invention. Suitable direct positive emulsions include silver halide emulsions the grains of which have high internal sensitivity in particular silver halide emulsions containing internal electron traps. Particular utility is exhibited by direct positive silver halide grains comprising a central core of a silver halide which contains centres which act as electron traps and an outer shell covering said core comprising a fogged silver halide that develops to silver without exposure. Emulsions of that type are disclosed by E. Moisar and F. Wagner in "Berichte der Bunsengesellschaft für physikalische Chemie" 67 (1963), pages 356–359. We furthermore refer to British patent specifications 1,027,146 and 1,151,-781 or to French patent specification 1,585,791. The formations of the centres or specks in the inside of the grains particularly on the core of the composite grain are produced as known per se by chemical sensitizing the emulsion with compounds of noble metals in particular gold or iridium salts are sulfur compounds such as thiosulfates. In particular useful is a treatment with noble metal salts and sulfur compounds.

The spectral sensitizers of the present invention can be applied to direct positive emulsions which are fogged on the surface so that they can be developed to silver without exposure and which contain at the surface electron acceptors such as desensitizing dyes. Suitable dyes for this purpose are well-known. Reference is made, e.g. to pinacryptol yellow or nitro-substituted polymethine dyes. The technic of desensitization and the chemical structure of suitable desensitizing dyes are described, e.g. by O. Riester in "Mitteilungen aus den Forschungslaboratorien der Agfa," volume 1 (1955), page 44, or in the handbook "Grundlagen der photographischen Prozesse mit Silberhalogeniden," volume 3, page 1077, published by Akademische verlagsgesellschaft (Frankfurt (1968). The direct positive sensitizing dyes of the present invention can be used in combination with further sensitizing dyes capable of sensitizing direct positive emulsions and desensitizing negative silver halide emulsions as described, for example, in U.S. patent specifications 3,314,796 or 3,505,070.

Further suitable direct positive emulsion are described in German patent specifications 606,392 or 642,222 or in U.K. patent specifications 851,773 or 655,009.

The direct positive emulsions may also contain mercury salts and thallium salts as described in British patent specification 1,203,744 or U.S. patent specification 3,620,750.

The direct positive silver halide emulsions may be fogged by the usual methods, for example by the action of light or by chemical fogging with a reducing compound, alone or in the presence of a compound of a metal which is more electropositive than silver as described in British patent specification No. 723,019.

Typical reducing compounds which are suitable for preparing such fogging silver halide emulsions are, for example, stannous salts, such as stannous chloride, hydrazine, sulfur compounds such as thiourea dioxide, phosphonium salts, e.g. tetra-(hydroxymethyl)-phosphonium chloride. Typical compounds of metals which are more electropositive than silver are, for example, compounds of gold, rhodium, platinum, palladium and iridium. It is preferred to use soluble salts of the said noble metals, e.g. potassium chloroaurate, auric chloride and $(NH_4)_2$—$PdCl_6$.

The concentration of the reducing agents or the compounds of the metal which is more electropositive than silver used for fogging can vary within wide limits. In general, concentrations of .0005 to about .06 milli-equivalents of reducing agent and about .001 to about .01 millimols of the noble metal salt per mol silver halide have proved sufficient.

Fogging can be also accomplished with the method of silver halide digestion described by Wood in "J. phot. Science" 1 (1963) page 163, at pAg values between 2 and 5 and pH values of about 6.5.

The new cyanine dyes are added to the washed silver halide emulsions preferably shortly before casting.

The incorporation of the dyes in the emulsions may be carried out by the usual known methods, for example, the dyes may be added to the emulsions from solutions in suitable solvents. The solvents must, of course, be selected so that they have no adverse effect on the light-sensitive photographic material which is to be produced. Suitable solvents are, for example, methanol, isopropanol, acetone and water, either separately or mixed with each other. Quantities of between 5 and 200 mg. per kg. of emulsion and particularly between 20 and 70 mg. per kg. of emulsion or of 30–1.200 mg., preferably 100–400 mg. per mol silver halide are generally suitable.

The emulsions containing one or more cyanine dyes according to the invention may be applied to the usual opaque or transparent photographic supports used for the preparation of photographic materials, for example supports of glass, cellulose acetate, cellulose acetobutyrates or polyesters, e.g. polyethylene terephthalate, or supports of baryta-coated paper or paper coated with polyolefines such as polyethylene.

The photographic silver halide emulsions to which the new cyanine dyes are added, as well as the other layers of a photographic material which is prepared using these emulsions may be hardened by the addition of the usual hardeners such as aldehyde hardeners, e.g. formaldehyde or mucochloric acid, or hardeners which are free from aldehyde groups such as trisacyloyl hexahydrotriazine.

The good sensitizing effect is preserved even in the presence of water-soluble and emulsified color couplers. The emulsion may also contain the usual wetting agents, stabilizers, brightening agents and other additives.

EXAMPLE 1

45 g. of sensitizer 1 in the form of a 1:1000 solution in methanol are added with stirring to 1 kg. of a direct positive silver bromide gelatin emulsion which has been prepared by chemical fogging with ammonia and excess silver nitrate and contains, per kilogram of casting solution, 0.4 mol of silver halide with an iodide content of 2.5 mols percent. The emulsion is then digested for further 10 minutes. Thereafter, 10 ml. of a 4% aqueous solution of saponin, as wetting agent, and 25 ml. of a 5% solution of mucochloric acid are added. The emulsion is applied onto a support of cellulose acetate in the usual manner.

The dried layer is exposed to white light in a sensitometer customarily employed in the art and developed for 5 minutes at 20° C. with a developer of the following composition:

|  | G. |
|---|---|
| p-Methylaminophenol | 3.5 |
| Anhydrous sodium sulfite | 60.0 |
| Hydroquinone | 9.0 |
| Anhydrous sodium carbonate | 40.0 |
| Potassium bromide | 3.5 |

Made up to 1 litre with water.

The layer is then fixed in the usual manner.

Figure 2:
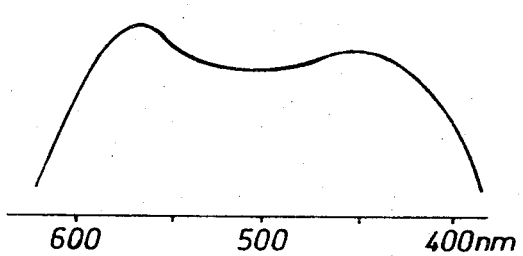

A positive image of the step wedge is obtained with very high density and steep gradation. The spectral sensitization curve is represented in FIG. 2. FIG. 1 represents the sensitivity curve obtained without the use of a sensitizer.

Figure 3:
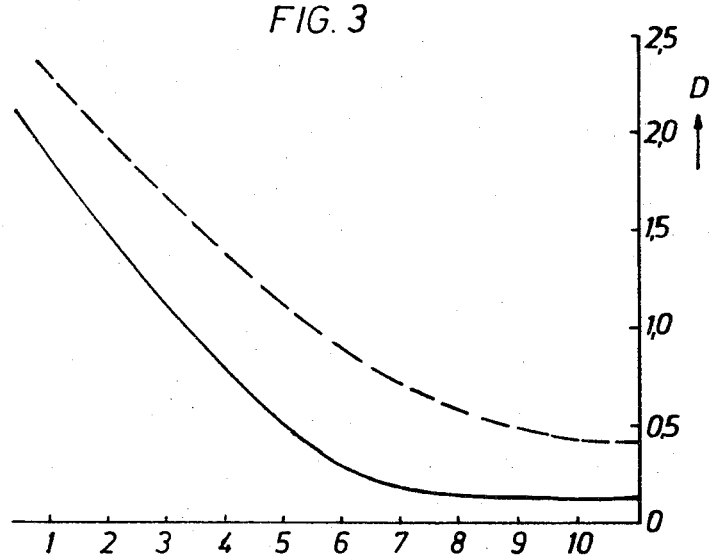

FIG. 3 represents the behaviour of the corresponding α - unsubstituted dye, bis-(3 - ethyl-benzothiazolo)-trimethine cyanine perchlorate, (broken line curve) compared with dye 1 (solid line curve). Although the unsubstituted dye shows a certain sensitization, with a maximum in the region of 600 nm., the gradation is very flat as compared with that obtained with dye 1, and above all, the positive image shows a very heavy fog.

EXAMPLE 2

Figure 4:
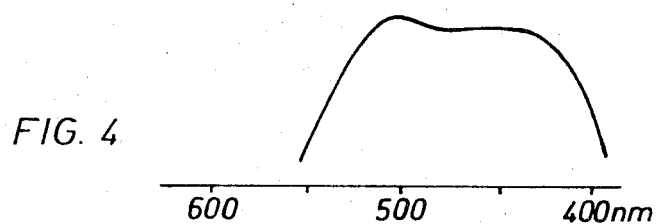
Figure 5:
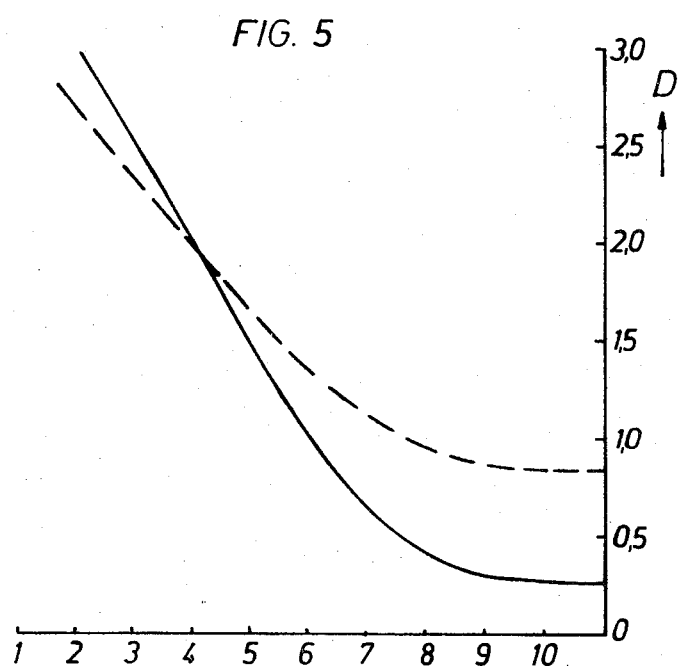

If in Example 1 dye 1 is replaced by an equal quantity of dye 2 the sensitization curve represented as a solid line curve in FIG. 4 is obtained. This as a sensitization maximum at 500 nm. and at the same time the natural sensitivity is increased. Again, as shown in FIG. 5, the corresponding α-unsubstituted dye, 3-ethylbenzothiazole-3-ethyl-thiazoline-trimethinecyanine perchlorate, (broken line curve) produces only a flat gradation and high fog compared with the result obtained with dye 2.

EXAMPLE 3

Figure 6:
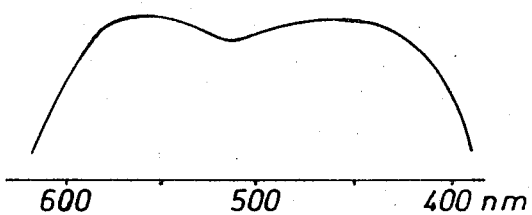
Figure 7:
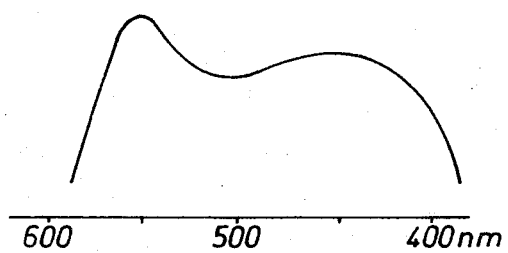
Figure 8:
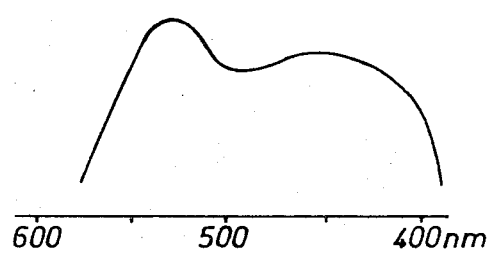
Figure 9:
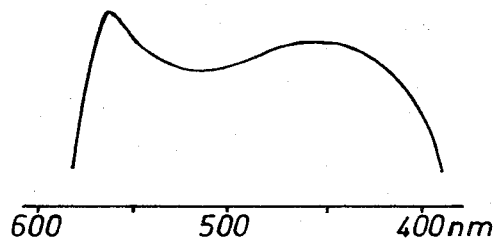

When dye 1 in Example 1 is replaced by an equal quantity of dye 4, the sensitization curve represented in FIG. 6 is obtained; dyes 35, 30 and 39 produce the sensitization curves represented in FIGS. 7, 8 and 9.

Similar results are obtained with the remaining sensitizing dyes of the above table.

What is claimed is:

1. A light sensitive photographic material comprising at least one direct positive fogged silver halide emulsion layer, which is spectrally sensitized with a polymethine sensitizing dye of one of the following formulae:

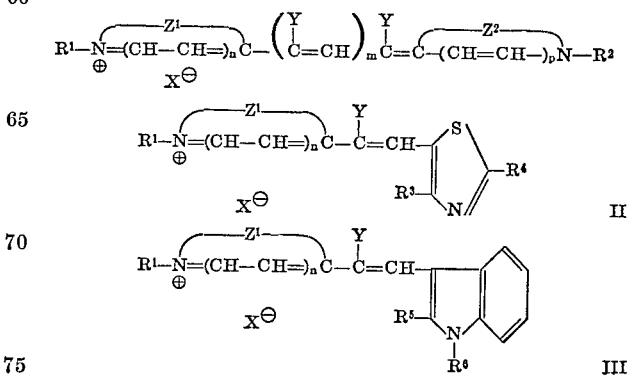

wherein
Y=a cyano, nitro, acyl group or hydrogen, at least one of Y represents a cyano, nitro or acyl group;
$R^1$, $R^2$=a saturated or unsaturated aliphatic group or aryl;
$R^3$=hydrogen, a saturated or unsaturated aliphatic group or aryl;
$R^4$=$SR^7$ or $NR^8R^9$;
$R^5$=a phenyl group;
$R^6$=hydrogen, a saturated or unsaturated aliphatic group, aryl or alkoxy;
$R^7$, $R^8$, $R^9$=a saturated or unsaturated aliphatic group or phenyl;
$n, p$=0 or 1;
$m$=0, 1, 2 or 3;
$X^-$=any anion and
$Z^1$, $Z^2$ represent the ring members required for completing one of the following rings: thiazole, benzothiazole, oxazole, benzoxazole, thiazoline, indolenine, pyrimidone, thiopyrimidone, quinoline, benzselenazole, oxadiazole, 1,8-naphthindole and imidazoquinoxaline.

2. The photographic material of claim 1, wherein Y represents cyano.

3. The photographic material of claim 1, wherein $m$ stands for 1 or 2 and at least one Y represents cyano.

References Cited
UNITED STATES PATENTS

| | | | |
|---|---|---|---|
| 2,393,743 | 1/1946 | Brooker et al. | 96—135 |
| 2,415,927 | 2/1947 | Anish | 96—137 |
| 3,023,102 | 2/1962 | Dersch et al. | 96—101 |
| 3,501,311 | 3/1970 | Lincoln et al. | 96—137 |
| 3,531,288 | 9/1970 | Jones | 96—101 |
| 3,687,674 | 8/1972 | Sato et al. | 96—101 |

J. TRAVIS BROWN, Primary Examiner

U.S. Cl. X.R.

96—101, 131, 132, 133, 134, 135, 136, 137